United States Patent [19]

Stecura

[11] Patent Number: 4,485,151
[45] Date of Patent: Nov. 27, 1984

[54] THERMAL BARRIER COATING SYSTEM

[75] Inventor: Stephan Stecura, Parma, Ohio

[73] Assignee: The United States of America as represented by the Administrator of the National Aeronautics and Space Administration, Washington, D.C.

[21] Appl. No.: 523,297

[22] Filed: Aug. 16, 1983

Related U.S. Application Data

[63] Continuation-in-part of Ser. No. 375,784, May 6, 1982, abandoned.

[51] Int. Cl.$^3$ .......................... C23C 7/00; C23D 5/00; B32B 15/04
[52] U.S. Cl. .................................. 428/633; 428/656; 428/678; 428/679; 428/680; 428/681; 428/682; 428/683; 428/684
[58] Field of Search ................ 428/633, 656, 678–685

[56] References Cited

U.S. PATENT DOCUMENTS

| | | | |
|---|---|---|---|
| Re. 24,242 | 12/1956 | Lohr | 75/171 |
| 3,589,894 | 6/1971 | Roush | 75/171 |
| 3,869,779 | 3/1975 | Gedwill et al. | 428/678 |
| 4,055,705 | 10/1977 | Stecura et al. | 428/633 |
| 4,095,003 | 6/1978 | Weatherly et al. | 428/633 |
| 4,101,713 | 7/1978 | Hirsch et al. | 428/554 |
| 4,101,715 | 7/1978 | Rairden | 428/652 |
| 4,123,594 | 10/1978 | Chang | 428/651 |
| 4,162,918 | 7/1979 | Huseby | 75/171 |
| 4,248,940 | 2/1981 | Goward et al. | 428/633 |
| 4,273,824 | 6/1981 | McComas et al. | 428/256 |
| 4,313,760 | 2/1982 | Dardi et al. | 428/678 |

OTHER PUBLICATIONS

Stecura, S., *Effects of Compositional Changes on the Performance of a Thermal Barrier Coating System*, NASA Tech. Memo., 78976 (1979).

Hodge, P. E. et al.; *Thermal Barrier Coatings: Burner Rig Hot Corrosion Test Results*, NASA TM-79005, pp. 2, 11, 13 (10/78).

McKee, D. W. et al.; "Resistance of Thermal Barrier Ceramic Coatings to Hot Salt Corrosion"; *Proc. of 1st Conf. on Adv. Matls.*, Conf.-790749, pp. 261, 269 (1979).

McKee, D. W. et al.; "Resistance of Thermal Barrier Ceramic Coatings to Hot Salt Corrosion", *Thin Solid Films*, vol. 73, pp. 439–445 (1980).

*Primary Examiner*—Veronica O'Keefe
*Attorney, Agent, or Firm*—Norman T. Musial; John R. Manning; Gene E. Shook

[57] ABSTRACT

This invention relates to a high temperature oxidation resistant thermal barrier coating system for a nickel-, cobalt-, or iron-base alloy substrate. An inner metal bond coating contacts the substrate, and a thermal barrier coating covers the bond coating.

NiCrAlR, FeCrAlR, and CoCrAlR alloys have been satisfactory as bond coating compositions where R=Y or Yb. These alloys contain, by weight, 24.9–36.7% chromium, 5.4–18.5% aluminum, and 0.05 to 1.55% yttrium or 0.05 to 0.53% ytterbium. The coatings containing ytterbium are preferred over those containing yttrium.

An outer thermal barrier coating of partially stabilized zirconium oxide (zirconia) which is between 6% and 8%, by weight, of yttrium oxide (yttria) covers the bond coating. Partial stabilization provides a material with superior durability. Partially stabilized zirconia consists of mixtures of cubic, tetragonal, and monoclinic phases.

8 Claims, 1 Drawing Figure

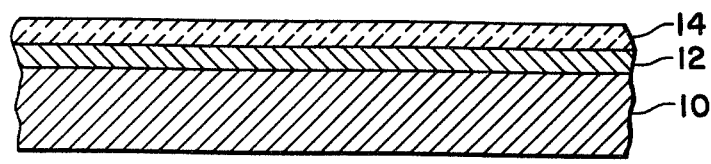

THERMAL BARRIER COATING SYSTEM

ORIGIN OF THE INVENTION

The invention described herein was made by an employee of the United States Government and may be manufactured and used by or for the Government for governmental purposes without the payment of any royalties thereon or therefor.

STATEMENT OF COPENDENCY

This application is a continuation-in-part of application Ser. No. 375,784, filed May 6, 1982, now abandoned.

TECHNICAL FIELD

This invention relates to high temperature oxidation resistant thermal barrier coating systems for nickel-, cobalt-, or iron-base alloy substrates. Such coating systems can be used on components of gas turbine engines, combustors, or other high temperature applications. It is desirable to improve the bond coating between the substrate and the thermal barrier oxide layer in a thermal barrier coating system to increase the adherence of the oxide layer, increase the life of the thermal barrier system, and facilitate the operation of the thermal barrier coated components at higher temperatures or for longer periods of time at lower temperatures than with conventional coatings.

Bond coatings are normally applied by flame or plasma spraying. Bond coatings are used with the oxide coatings to form thermal barrier systems. Such systems have been used in regeneratively cooled rocket engines. By way of example, the X-15 aircraft utilized a thermal barrier coating system which consisted of Ni-20w/o Cr bond coating followed by a gradually graded layer of Ni-20w/o Cr and calcia-stabilized zirconia so that the surface layer was 100% stabilized zirconia. Similar coating systems have also been proposed for use in nuclear rocket engines exhausting hydrogen. Also, a Ni-20w/o Cr bond coating with a calcia-stabilized zirconia thermal barrier coating has been tested on vanes in a jet engine at relatively low uncoated superalloy temperatures of about 1700° F.

BACKGROUND ART

Stabilized zirconia with up to about 35 w/o tungsten has been suggested for use in rockets in U.S. Pat. No. 3,410,716. Stabilized zirconia has also been used as a protective coating in U.S. Pat. No. 3,719,519. The patentee is concerned with matching the thermal expansions of oxide, underlayer, and substrate. Normally the underlayer consisted of either an alloy with desired thermal expansion coefficient or a mixture of the oxide and alloy.

U.S. Pat. No. 3,091,548 points out that refractory materials coated by prior art techniques have generally failed by chipping and spalling due to hard bond strength between the coating and the base plate as well as to the poor thermal shock resistance of the coating. Failure is also caused by the difference in expansion coefficients between the coating and the base material.

Recently, a NiCrAlY bond coating with a yttria-stabilized zirconia thermal barrier layer was used successfully. This system is significantly better than any previous two layer thermal barrier coating system as pointed out in U.S. Pat. No. 4,055,705. The performance of a two-layer thermal barrier system is very sensitive to the concentration of yttrium in the bond coating and the concentration of yttria in the zirconia layer. It has been shown that the performance of a two-layer thermal barrier system is also very dependent on the concentration of chromium and aluminum in the NiCrAlY bond coating.

The Ni-20 w/o Cr bond coating with a graded Ni-20 w/o Cr/$ZrO_2$—CaO barrier coating exhibits only modest adherence and frequently suffers from partial or fatal barrier spallation or thermal shock cracking after short periods of exposure to high temperatures. In addition, the quality control problems involved in applying a continuous graded barrier are large and tedious. Also, a Ni-20 w/o Cr bond coating coupled with calciastbilized zirconia fails in less than 100 one hour cycles between 1800° and 540° F.

Stabilized zirconia mixed with up to 35 w/o tungsten will not withstand many exposures at high temperatures without cracking and spalling as pointed out in U.S. Pat. No. 3,410,716. The coatings discussed in U.S. Pat. No. 3,719,519 were exposed to very few, long time period cycles below 1800° F. Furthermore, the underlayer was such that the thermal expansion coefficient value was between the thermal expansion values of the substrate and the surface oxide. Such underlayer coatings consist of one or more layers depending on whether a metal, alloy, or a mixture of metal-oxide is used. Thus, matching of thermal expansion coefficients of various layers is very critical to the performance of the thermal barrier system. Furthermore, as pointed out in U.S. Pat. No. 3,091,548 a two-layer thermal barrier system fails because of the difference in expansion coefficients between the coating and the base material. Attempts to use a metal undercoat under a refractory coating have been either totally unsuccessful or have shown only limited success.

The thermal barrier coating system described in the Applicant's U.S. Pat. No. 4,055,705 comprises a NiCrAlY bond coating and a yttria- or a magnesia-stabilized zirconia thermal barrier layer. It was discovered that the performance of this two-layer thermal barrier system is very sensitive to the concentration of yttrium, chromium, and aluminum in the NiCrAlY bond coating as well as the yttria concentration in the zirconia thermal barrier layer. Thus, a Ni-25w/o Cr-6w/o Al-0.3 w/o Y bond coating is about 2½ times better than a Ni-16.4 w/o Cr-5.1 w/o Al-0.15 w/o Y bond coating and about five times better than a Ni-16.6 w/o Cr-5.5 w/o Al-1.08 w/o Y bond coating. It has also been found that a Ni-16w/o Cr-6w/o Al-0.3 w/o Y bond coating is many times superior to a coating of Co-16w/o Cr-16w/o Al-0.3w/o Y or Fe-16w/o Cr-6w/o Al-0.3w/o Y.

DISCLOSURE OF INVENTION

In the thermal barrier coating system of the present invention the inner metal bond coating layer, which contacts the surface of the gas turbine component, consists essentially of nickel, cobalt, or iron alloyed with chromium, aluminum, and a rare earth metal, such as yttrium or ytterbium. Optimized concentrations of aluminum, chromium, and yttrium or ytterbium present in the bond coat alloy will insure maximum thermal barrier system life. NiCrAlR, FeCrAlR, and CoCrAlR alloys, where, R=Y or Yb, containing, by weight, about 24.9% to about 36.7% chromium, about 5.4% to about 18.5% aluminum, and about 0.05% to about 1.55% yttrium or about 0.05 to about 0.53% ytterbium have been satisfactory as bond coating compositions in the two layer thermal barrier systems. It has been found that ytterbium is preferred over yttrium in the alloys.

The metal bond coating layer is, in turn, coated with an outer layer containing partially stabilized zirconium oxide (zirconia) which is between 6% and 8% by weight of yttrium oxide (yttria). Partial stabilization provides a material with superior durability. Fully stabilized zirconia consists totally of cubic phase material which is greater than 12 w/o yttria if yttria is used as the cubic phase stabilizer. Partially stabilized zirconia consists of mixtures of cubic, tetragonal, and monoclinic phases.

BRIEF DESCRIPTION OF THE DRAWING

The drawing is a vertical section view of a substrate protected by a thermal barrier coating system constructed in accordance with the present invention.

BEST MODE FOR CARRYING OUT THE INVENTION

Referring now to the drawing a substrate 10 which is to be used in a hot environment is coated in accordance with the present invention. The substrate 10 may be a component of an aircraft gas turbine engine, ground electric power generating turbine, propulsion turbine, combustor, or other components that are air-liquid cooled.

The substrate 10 is of a nickel-, cobalt-, or iron-base alloy. Iron-base components are preferably used in ground electric generating systems and heat reflectors in fire prevention systems.

A bond coating 12 is coupled with a zirconia partially stabilized with yttria (6 w/o to 8 w/o $Y_2O_2$) thermal barrier layer 14 to form a two layer or duplex thermal barrier system to protect the surface of the substrate 10. It is contemplated that the bond coating 12 for nickel base alloy substrates 10, such as MAR-M-200+HF, may be Ni-25.4-35.7 w/o Cr-5.6-6.33 w/o Al and 0.77-1.55 w/o Y or $0.341 \propto 0.53$ w/o Yb as shown in Table I.

TABLE I

Cyclic Furnace Tests of Various Bond Coatings and Thermal Barrier Coatings on MAR-M-200 + Hf Substrates

| BOND COATING | | THERMAL BARRIER COATING | | |
|---|---|---|---|---|
| Thick., cm | Composition, wt % | Thick., cm | Composition, wt % | Cycle to failure |
| 0.020 | Ni—25.2Cr—5.60Al—0.07Y | 0.038 | $ZrO_2$—8.0$Y_2O_3$ | 212 |
| .019 | Ni—25.70Cr—5.60Al—0.29Y | .038 | $ZrO_2$—8.0$Y_2O_3$ | 495 |
| .020 | Ni—26.59Cr—6.33Al—0.77Y | .036 | $ZrO_2$—8.0$Y_2O_3$ | 1,021 |
| .020 | Ni—26.82Cr—6.27Al—1.35Y | .037 | $ZrO_2$—8.0$Y_2O_3$ | 1,158 |
| .019 | Ni—24.98Cr—6.36Al—0.095Y | .041 | $ZrO_2$—6.1$Y_2O_3$ | 406 |
| .019 | Ni—25.70Cr—5.60Al—0.77Y | .040 | $ZrO_2$—6.1$Y_2O_3$ | 1,146 |
| .021 | Ni—26.82Cr—6.33Al—1.35Y | .036 | $ZrO_2$—6.1$Y_2O_3$ | 1,253 |
| 0.020 | Ni—34.63Cr—6.37Al—0.14Y | 0.039 | $ZrO_2$—8.0$Y_2O_3$ | 438 |
| .020 | Ni—35.03Cr—6.09Al—0.22Y | .040 | $ZrO_2$—8.0$Y_2O_3$ | 639 |
| .019 | Ni—35.05Cr—5.92Al—0.92Y | .037 | $ZrO_2$—8.0$Y_2O_3$ | 1,232 |
| .022 | Ni—35.65Cr—6.32Al—1.55Y | .039 | $ZrO_2$—8.0$Y_2O_3$ | 1,145 |
| .020 | Ni—34.63Cr—6.37Al—0.14Y | .042 | $ZrO_2$—6.1$Y_2O_3$ | 665 |
| .021 | Ni—35.03Cr—6.09Al—0.22Y | .040 | $ZrO_2$—6.1$Y_2O_3$ | 818 |
| .020 | Ni—35.05Cr—5.92Al—0.92Y | .039 | $ZrO_2$—6.1$Y_2O_3$ | 1,355 |
| .018 | Ni—35.65Cr—6.32Al—1.55Y | .040 | $ZrO_2$—6.1$Y_2O_3$ | 1,277 |
| 0.022 | Ni—35.6Cr—5.9Al—0.34Yb | 0.040 | $ZrO_2$—8.0$Y_2O_3$ | 793 |
| .022 | Ni—35.6Cr—5.9Al—0.34Yb | .037 | $ZrO_2$—8.0$Y_2O_3$ | 806 |
| 0.020 | Ni—35.6Cr—5.9Al—0.34Yb | 0.037 | $ZrO_2$—6.1$Y_2O_3$ | 806 no |
| .022 | Ni—35.6Cr—5.9Al—0.34Yb | .037 | $ZrO_2$—6.1$Y_2O_3$ | 806 no |
| 0.019 | Ni—25.4Cr—6.2Al—0.53Yb | 0.042 | $ZrO_2$—8.0$Y_2O_3$ | 806 |
| .019 | Ni—25.4Cr—6.2Al—0.53Yb | .038 | $ZrO_2$—8.0$Y_2O_3$ | 793 |
| 0.020 | Ni—25.4Cr—6.2Al—0.53Yb | 0.038 | $ZrO_2$—6.1$Y_2O_3$ | 806 no |
| .022 | Ni—25.4Cr—6.2Al—0.53Yb | .037 | $ZrO_2$—6.1$Y_2O_3$ | 806 no |
| 0.020 | Ni—20.5Al—0.81Yb | 0.038 | $ZrO_2$—8.0$Y_2O_3$ | 560 |
| .020 | Ni—20.5Al—0.81Yb | .037 | $ZrO_2$—8.0$Y_2O_3$ | 482 |
| 0.020 | Ni—20.5Al—0.81Yb | 0.039 | $ZrO_2$—6.1$Y_2O_3$ | 639 |
| .022 | Ni—20.5Al—0.81Yb | .039 | $ZrO_2$—6.1$Y_2O_3$ | 639 |

*no = no failure

The bond coating 12 for iron base alloy substrates 10, such as Fe-22Cr-5.8Al-0.5Co, is Fe-24.89-35.75 w/o Cr-6.32-10.3 w/o Al-0.05-0.14 w/o R as shown in Table II. R is either Yttrium or ytterbium. Increasing yttrium concentrations to 0.7 w/o and 1.4 w/o contributes to a very significant decrease in the life of the thermal barrier system. The use of ytterbium in this bond coating improves the performance life of the thermal barrier system as shown in Table II.

TABLE II

Cyclic Furnace Tests of Various Bond Coatings and Thermal Barrier Coatings on Fe—22Cr—5.8Al—0.5Co Substrates

| BOND COATING | | THERMAL BARRIER COATING | | |
|---|---|---|---|---|
| Thick., cm | Composition, wt % | Thick., cm | Composition, wt % | Cycles to failure |
| 0.020 | Fe—16.03Cr—5.49Al—0.37Y | 0.041 | $ZrO_2$—8.0$Y_2O_3$ | 13 |
| .020 | Fe—16.39Cr—5.66Al—0.12Y | .039 | $ZrO_2$—8.0$Y_2O_3$ | 96 |
| .022 | Fe—16.54Cr—5.76Al—0.06Y | .037 | $ZrO_2$—8.0$Y_2O_3$ | 259 |
| .022 | Fe—25.14Cr—6.37Al—0.05Y | .039 | $ZrO_2$—8.0$Y_2O_3$ | 1,222 |
| .020 | Fe—24.89Cr—10.30Al—0.10Yb | .033 | $ZrO_2$—8.0$Y_2O_3$ | 1,406 |
| .020 | Fe—35.92Cr—18.68Al—0.12Yb | .037 | $ZrO_2$—8.0$Y_2O_3$ | 213 |
| .020 | Fe—35.75Cr—10.30Al—0.14Yb | .037 | $ZrO_2$—8.0$Y_2O_3$ | 1,622 |

TABLE II-continued

Cyclic Furnace Tests of Various Bond Coatings and Thermal Barrier Coatings on Fe—22Cr—5.8Al—0.5Co Substrates

| BOND COATING | | THERMAL BARRIER COATING | | Cycles to failure |
|---|---|---|---|---|
| Thick., cm | Composition, wt % | Thick., cm | Composition, wt % | |
| .020 | Fe—35.29Cr—6.32Al—0.09Yb | .039 | $ZrO_2$—8.0$Y_2O_3$ | 1,703 |

The bond coating 12 for cobalt-base alloy substrates 10, such as MAR-M-509, is Co-25.07–36.7 w/o Cr-5.61–18.47 w/o Al-0.05–0.15 w/o R as shown in Table III. Again, increasing yttrium to 0.3 w/o, 0.6 w/o, and 1.1 w/o significantly decreases the life of the thermal barrier system. The use of ytterbium in the bond coating 12 improves the performance life as shown in Table III.

TABLE III

Cyclic Furnace Tests of Various Bond Coatings and Thermal Barrier Coatings on MAR-M-509 Substrates

| BOND COATING | | THERMAL BARRIER COATING | | Cycles to failure |
|---|---|---|---|---|
| Thick., cm | Composition, wt % | Thick., cm | Composition, wt % | |
| 0.019 cm | Co—16.74Cr—5.85Al—0.16Y | 0.039 | $ZrO_2$—8.0$Y_2O_3$ | 34 |
| .020 | Co—16.60Cr—5.97Al—0.06Y | .040 | $ZrO_2$—8.0$Y_2O_3$ | 44 |
| .019 | Co—16.60Cr—5.97Al—0.06Y | .037 | $ZrO_2$—6.1$Y_2O_3$ | 76 |
| .020 | Co—25.07Cr—6.75Al—0.09Y | .038 | $ZrO_2$—8.0$Y_2O_3$ | 156 |
| .022 | Co—25.07Cr—6.75Al—0.09Y | .040 | $ZrO_2$—6.1$Y_2O_3$ | 203 |
| .022 | Co—36.65Cr—5.61Al—0.05Yb | .041 | $ZrO_2$—8.0$Y_2O_3$ | 116 |
| .022 | Co—36.70Cr—10.14Al—0.05Yb | .039 | $ZrO_2$—8.0$Y_2O_3$ | 273 |
| .019 | Co—35.68Cr—18.47Al—0.15Yb | .038 | $ZrO_2$—8.0$Y_2O_3$ | 273 |

The bond coating 12 is applied by plasma spraying onto alumina grit blast cleaned substrates 10. No special cover gas or inert atmosphere chamber is needed. Bond coatings 12 range from 0.003 to 0.022 inch thick. It has been found that the adherence of the Ni-O-35 w/o Cr-5.5–15 w/o Al-0.05–1.5 w/o R; Fe-16–35 w/o Cr 6–18 w/o Al-0.05–0.14 w/o R, and Co-16–35 w/o Cr-6–18 w/o Al-0.05–0.16 w/o R to cobalt-, nickel-, and iron-base alloys is excellent.

Furnace cyclic tests of various bond coatings 12 coupled with $ZrO_2$6.1$Y_2O_3$ and $ZrO_2$-8.0$Y_2O_3$ thermal barrier coatings 14 on 2.5×1.3×0.25 cm metal specimens 10 were conducted between 1110° C. and 280° C. The tests comprises cycles of 6 minutes heat up to 1110° C., holding at 1110° C. for 60 minutes, and 60 minutes of cooling to about 280° C.

The results of these tests are presented in the Tables I, II and III. These tests show that the bond coatings containing ytterbium are better than those containing yttrium. Also, the bond coatings containing 25 w/o Cr are better than those containing 16 w/o Cr when the aluminum and yttrium concentrations are the same.

The data set forth in the Tables show that in cyclic natural gas-oxygen torch burner rigs the bond coatings containing ytterbium are significantly better than those containing yttrium. The data in the Tables show that the best thermal barrier is partially stabilized zirconia containing between 6 w/o and 8 w/o $Y_2O_3$. To have long performance life the yttria-stabilized zirconia must always be present in the cubic, monoclinic, and tetragonal phases below the monoclinic to tetragonal transformation temperature and in the cubic and tetragonal phases above the transformation temperature.

It has also been determined experimentally that the bond coatings shown in the Tables insure very good adherence to the oxide layer regardless of the substrate material. Thus, NiCrAlY and NiCrAlYb have been used successfully on cobalt- and iron-base alloys. Also, cobalt-base alloy bond coatings were used successfully on nickel and iron-base alloy substrates. The same was established with the iron-base alloy bond coatings.

It was determined further that the iron-base alloy bond coatings consisting of about Fe-16 w/o Cr-6 w/o Al-0.16 w/o Y coupled with $ZrO_2$-6.1$Y_2O_3$ on B-1900 alloy air cooled blades withstood over 650 one-hour cycles in a Mach 1.0 burner rig at surface temperatures of about 2350° F.

The information set forth above shows that degradation of the bond coating 12 through oxidation is significantly retarded by optimizing the chromium, aluminum, and ytterbium or yttrium concentrations in nickel, cobalt-, or iron-base coatings. This retards the destruction of the forces that originally existed between the metal bond coating and the oxide layer.

Although the preferred embodiment of the invention has been disclosed it will be apparent that various modifications may be made to the coatings without departing from the spirit of the invention or the scope of the subjoined claims.

I claim:

1. A coated article of manufacture having a duplex thermal barrier coating system comprising
    a substrate of a material selected from the group consisting of nickel-base, cobalt-base, and iron-base alloys,
    a bond coating consisting essentially of an alloy of about 24.9 w/o to about 36.7 w/o chromium, about 5.5 w/o to about 18.5 w/o aluminum, and about 0.05 w/o to about 0.53 w/o ytterbium with a metal selected from the group consisting essentially of nickel, cobalt, and iron, and
    a thermal barrier coating consisting essentially of zirconia partially stabilized with about 6% by weight to about 8% by weight yttria.

2. A coated article of manufacture as claimed in claim 1 wherein the bond coating has a thickness between about 0.003 inch and 0.022 inch.

3. A coated article of manufacture as claimed in claim 2 wherein
    the substrate is a nickel base alloy, and the bond coating is an alloy comprising about 25.4 w/o to about 35.7 w/o chromium, about 5.6 w/o to about 6.4 w/o aluminum, about 0.34 w/o to about 0.53 w/o ytterbium, and the remainder nickel.

4. A coated article of manufacture as claimed in claim 2 wherein
the substrate is an iron base, alloy and
the bond coating contains about 0.09 w/o to about 0.14 w/o ytterbium, and the remainder iron.

5. A coated article of manufacture having a duplex thermal barrier coating system comprising
a substrate of a material selected from the group consisting of nickel-base, cobalt-base, and iron-base alloys,
a bond coating consisting essentially of an alloy of about 24.9 w/o to 36.7 w/o chromium, about 5.6 w/o to about 18.5 w/o aluminum, and about 0.05 w/o to about 0.53 w/o ytterbium with a metal selected from the group consisting essentially of nickel, cobalt, and iron, and
a thermal barrier coating consisting essentially of zirconia partially stabilized with about 6% by weight to about 8% by weight yttria.

6. A coated article of manufacture as claimed in claim 5 wherein
the substrate is a nickel base alloy, and
the bond coating is an alloy comprising about 25.4 w/o to about 35.6 w/o chromium, about 5.9 w/o to about 6.2 w/o aluminum, about 0.34 w/o to about 0.53 w/o ytterbium, and the remainder nickel.

7. A coated article of manufacture as claimed in claim 5 wherein
the substrate is an iron base alloy, and
the bond coating contains about 0.09 w/o to about 0.14 w/o ytterbium.

8. A coated article of manufacture as claimed in claim 5 wherein
the substrate is a cobalt base alloy, and
the bond coating contains about 0.05 w/o to about 0.15 w/o ytterbium.

* * * * *